(12) United States Patent
Edin et al.

(10) Patent No.: US 11,850,776 B2
(45) Date of Patent: Dec. 26, 2023

(54) SYSTEM AND METHOD FOR GAS BLEED LINES IN COMPOSITE PART MOLDING OPERATIONS

(71) Applicant: HED CYCLING PRODUCTS, INC., Roseville, MN (US)

(72) Inventors: Christopher Andrew Edin, Mahtomedi, MN (US); Gregory Paul Alexander, Woodbury, MN (US)

(73) Assignee: HED CYCLYING PRODUCTS, INC., Roseville, MN (US)

( * ) Notice: Subject to any disclaimer, the term of this patent is extended or adjusted under 35 U.S.C. 154(b) by 0 days.

(21) Appl. No.: 17/498,652

(22) Filed: Oct. 11, 2021

(65) Prior Publication Data
US 2022/0024160 A1 Jan. 27, 2022

Related U.S. Application Data

(63) Continuation of application No. 16/150,851, filed on Oct. 3, 2018, now Pat. No. 11,141,892.

(60) Provisional application No. 62/567,568, filed on Oct. 3, 2017.

(51) Int. Cl.
*B29C 44/58* (2006.01)
*B29C 33/00* (2006.01)
*B29C 70/34* (2006.01)
*B29C 44/56* (2006.01)
*B29C 33/10* (2006.01)
*B29C 70/44* (2006.01)

(52) U.S. Cl.
CPC .......... *B29C 44/588* (2013.01); *B29C 33/005* (2013.01); *B29C 44/5609* (2013.01); *B29C 70/34* (2013.01); *B29C 33/10* (2013.01); *B29C 70/446* (2013.01)

(58) Field of Classification Search
CPC ... B29C 33/005; B29C 33/10; B29C 44/5609; B29C 44/588; B29C 70/34; B29C 70/446
See application file for complete search history.

(56) References Cited

U.S. PATENT DOCUMENTS 5,234,326 A * 8/1993 Galli ................ B29C 33/10
425/46
2018/0243954 A1* 8/2018 Beamish ................ B29C 33/10

* cited by examiner

*Primary Examiner* — Michael M. Robinson
*Assistant Examiner* — Victoria Bartlett
(74) *Attorney, Agent, or Firm* — Sprinkle IP Law Group

(57) ABSTRACT

An apparatus for molding a composite material comprising a plurality of mold pieces that cooperate to form a mold having a mold cavity for molding a composite part, the plurality of mold pieces split along a plurality of part lines configured to reduce voiding, the plurality of part lines comprising part lines running from a plurality of voiding areas of the mold cavity to an outer surface of the mold and adapted to provide bleed lines for the plurality of voiding areas.

15 Claims, 10 Drawing Sheets

SYSTEM AND METHOD FOR GAS BLEED LINES IN COMPOSITE PART MOLDING OPERATIONS

RELATED APPLICATIONS

This application is a continuation of, and claims a benefit of priority under 35 U.S.C. 120 from, U.S. patent application Ser. No. 16/150,851, filed Oct. 3, 2018, entitled "System and Method for Gas Bleed Lines in Composite Part Molding Operations," issued as U.S. Pat. No. 11,141,892, which claims the benefit of priority under 35 U.S.C. § 119(e) to U.S. Provisional Patent Application No. 62/567,568, filed Oct. 3, 2017, entitled "System and Method for Gas Bleed Lines in Composite Part Molding Operations," by Edin, et al., filed Oct. 3, 2017, the contents of which are hereby fully incorporated herein by reference for all purposes.

TECHNICAL FIELD

This disclosure relates generally to molding of composite parts. In particular, this disclosure relates to systems and methods for molds with gas bleed lines.

BACKGROUND

Manufacturers in many industries (sporting goods, automotive, aerospace, etc.) use composite materials (carbon fiber, fiberglass, and other composite materials) to make lightweight, strong components in partly enclosed ("vacuum forming") or fully enclosed ("clamshell compression molding") molds. Typical molds for composite parts include two halves that define a mold cavity having the shape of the outer surface of the part to be molded. A layered assembly of composite plies is layered against the mold cavity surfaces of each mold half and the mold halves brought together to complete the mold. During a molding operation, the layered assembly of composite plies are simultaneously pressurized against the mold surface (e.g., using a bladder or mechanism installed prior to closing the mold) and heated. The composite material transitions from flexible to rigid during the heating process.

Typically, the lines along which the molds are split between the mold halves—referred to in the industry as "part lines"—are selected for ease of manufacturing. That is, the part line is chosen in whatever way makes the mold easiest to produce. Typical part lines minimize the number of mold pieces, such that mold pieces meet at flat (easy to machine) surfaces.

During the molding operation, air tends to become trapped along the surface of the part—that is, between the composite part being molded and the mold—displacing the epoxy or other resin. This is particularly a problem with pre-preg carbon and other pre-impregnated composites, though the problem is not limited to such materials. In any case, the bubbles that form where epoxy/resin should have been cause "voids," which are widely considered undesirable. Minor voids are considered cosmetically defective, while major voids can disqualify a part from being structurally stable. Manufacturers typically sand, fill, and paint over the cosmetic voiding. Although effective at concealing cosmetic defects, this technique is time consuming, expensive, and adds unnecessary weight to the product.

SUMMARY

One embodiment comprises an apparatus for molding a composite part. The apparatus comprises a plurality of mold pieces that cooperate to form a mold having a mold cavity for molding a composite part. The plurality of mold pieces are split along a plurality of part lines configured to reduce voiding. The plurality of part lines comprises part lines running from a plurality of voiding areas of the mold cavity to an outer surface of the mold and adapted to provide bleed lines for the plurality of voiding areas. According to one embodiment, the plurality of mold pieces are adapted to separate, responsive to an application of pressure in the mold cavity, at the plurality of part lines to form the bleed lines.

In one embodiment, the plurality of part lines can include part lines running from each corner in an upper portion of the mold cavity and that is below a radius threshold. The part lines can run to the outer surface of the mold. In addition or in the alternative, the plurality of part lines can include part lines running from each corner in a lower portion of the cavity that is below the radius threshold. The part lines can run to the outer surface of the mold.

According to one embodiment, the plurality of voiding areas comprises a first corner in an upper portion of the mold cavity and a second corner in the upper portion of the mold cavity. Further the plurality of part lines comprises a part line running from the first corner to the outer surface of the mold and adapted to provide a bleed line for the first corner and a second part line running from the second corner to the outer surface of the mold and adapted to provide a bleed line for the second corner. According to one embodiment, the part line running from the first corner to the outer surface follows a curvature of the first corner from a first end of the mold cavity to a second end of the mold cavity and the part line running from the second corner to the outer surface follows a curvature of the second corner from the first end of the mold cavity to the second end of the mold cavity.

According to one embodiment, the plurality of mold pieces defines a third corner of the mold cavity and a fourth corner the mold cavity. The plurality of part lines can include a part line running from the third corner to the outer surface of the mold and adapted to provide a bleed line for the third corner and a part line running from the fourth corner to the outer surface of the mold and adapted to provide a bleed line for the fourth corner.

According to one embodiment, the plurality of mold pieces defines a fifth corner of the mold cavity and a sixth corner the mold cavity. The plurality of part lines can include a part line running from the fifth corner to the outer surface of the mold and adapted to provide a bleed line for the fifth corner and a part line running from the sixth corner to the outer surface of the mold and adapted to provide a bleed line for the sixth corner.

According to one embodiment, the plurality of part lines further comprises a part line running from an uppermost portion of the mold cavity to the outer surface of the mold and adapted to provide a bleed line for the uppermost portion. In addition or in the alternative, the plurality of part lines can further include a part line running from a lowermost portion of the mold cavity to the outer surface of the mold and adapted to provide a bleed line for the lowermost portion.

According to one embodiment, the mold cavity is curved from a first end of the mold cavity to a second end of the mold cavity.

According to one embodiment, the plurality of mold pieces comprises at least three mold pieces.

According to one embodiment, the apparatus further comprises a first end plate and a second end plate coupled to the plurality of mold pieces.

According to one embodiment, the apparatus further comprises a shaped bladder inflatable to press composite material against a molding surface of the mold cavity.

According to one embodiment, the plurality of part lines comprises a part line running from a smallest radius in an upper portion of the mold cavity to the outer surface.

According to one embodiment, the plurality of part lines comprises a straight part line.

According to one embodiment, the plurality of part lines comprises a curved part lines.

Another embodiment includes a molding method. The molding method includes assembling a plurality of mold pieces into a mold having a mold cavity, the plurality of mold pieces split along a plurality of part lines configured to reduce voiding. The plurality of part lines can comprise part lines running from a plurality of voiding areas of the mold cavity to an outer surface of the mold. The part lines can be adapted to provide bleed lines for the plurality of voiding areas. The method can further include applying heat and pressure to the mold to cure a composite material disposed in the mold cavity into composite part. The method may include bleeding gas bubbles from the voiding areas of the mold cavity via the bleed lines provided by the plurality of part lines. According to one embodiment, the method may comprise separating the plurality of mold pieces during the curing to form the bleed lines at the plurality of part lines.

One embodiment of a method further includes molding a test composite part to determine the plurality of voiding areas and configuring the plurality of mold pieces based on a result of molding the test composite part to reduce voiding.

One embodiment further comprises configuring the plurality of mold pieces to create part lines to the outer surface of the mold from every corner in an upper portion of the mold cavity that is below a radius threshold. In addition or in the alternative, one embodiment can comprise configuring the plurality of mold pieces to create part lines to the outer surface of the mold from every corner in a lower portion of the mold cavity that is below a radius threshold.

These and other aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
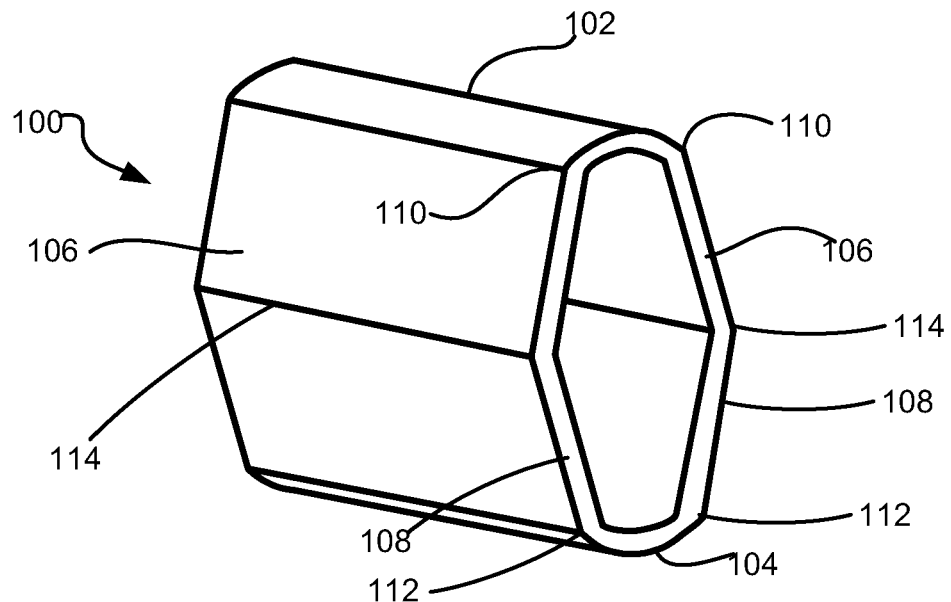
FIG. 1 is a diagrammatic representation of one embodiment of a composite component.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

For purposes of this disclosure, positional terms such as "top," "upper," "higher," "highest," etc. refer to positions relative to the orientation of the mold when the mold is undergoing a cooking process. Thus, a "highest corner" refers to a corner that will be the "highest corner" during the cooking process.

Embodiments described herein provide a method of mold design for composite parts that allows for the manufacturing of parts of superior cosmetic and structural quality. In some instances, parts can be molded with high enough quality that they do not require any fill or paint. This reduces the complexity, time and expense of the manufacturing process.

According to embodiments described herein, a mold is split into pieces based on the anticipated problematic voiding areas. Voiding typically occurs, for example, along sharper radii and along the upper surfaces of a part. As such, the mold can be broken into parts such that the faces of adjacent mold parts create bleed lines at sharp corners, upper surfaces of the part and other voiding areas. A voiding area refers to an area at which voiding would occur in the absence of a bleed line to bleed gas from that area.

Manipulating how a mold is split can increase the number, length, or complexity of part lines, or any combination of these things, but reduces the need for filling after a part is molded. Gaps at the interfaces between mold pieces provide an exit for air trapped with the mold cavity. By applying extra part lines to the problematic areas of the composite part, air (or other gasses) can escape the mold cavity, which prevents surface voids. These bleed lines may be straight, formed between flat faces, or have more complicated shapes, such as curved shapes where the junction of two mold pieces is a curved surface.

Molds described herein may be formed of a variety of materials suitable for use in molding composites. Molds may be formed, for example, of metal (e.g., aluminum, steel or other metal), plastic, carbon fiber or other composite material or other material. The material(s) from which the mold is formed can depend on a number of factors, including the composite being molded, the cook temperatures, the cook time or other factors.

Embodiments described herein split the mold into a number of mold pieces to create interfaces between mold pieces at selected locations to reduce or prevent voiding. The mold pieces can be held together with sufficient force to mold the composite part but with enough play to allow gaps to form between adjacent faces of mold pieces that allow air (or other gases) and, in some cases, excess resin to escape between the mold pieces. In some embodiments, adjacent mold pieces may abut when assembled, but split slightly during cooking (e.g., due to gas pressure) to form the bleed lines that allow gas to escape. In other embodiments, mold pieces may be spaced apart slightly when the mold is fully assembled prior to cooking. The bleed lines may, in some embodiments, pass from the mold cavity to the outer surface of the mold and run the entire width or length of the mold. The various parts may be machined or otherwise formed and process parameters selected (e.g., pressure, temperature or other parameters) to limit the maximum width of the bleed lines during the molding operation. According to one embodiment, for example, molds may be adapted so that that bleed lines do not exceed 0.25 mm wide.

In general, the placement of part lines can be selected based on a variety of factors including the shape of the mold cavity. In some cases, part lines can be positioned at sharp corners on the inner surface of the mold that risk voiding in the absence of the part lines. For example, part lines may be placed at sharp corners in the upper half of the mold cavity. In addition or in the alternative, part lines may be placed at the highest portion of a mold cavity to create bleed lines at the upper surface of the part. Part lines may also be placed at any other corner or position of the mold cavity that risks voiding. In one embodiment, part lines may be positioned at each sharp corner in the upper half of the mold cavity or even every sharp corner that has a radius less than a radius threshold. In some embodiments, the radius threshold may be 15 mm or less, including, but not limited to, 5 mm or less.

The positions of part lines may be determined, in some cases, based on empirical testing. For example, a test composite part may be formed using a first mold (e.g., a traditional mold) and the areas of voiding observed. A new mold can be created with the same mold cavity shape as the first mold, but with part lines at the areas of the shape that caused voiding in the test part. These part lines can be in addition to or in lieu of the part lines that were included in the first mold.

In contrast to traditional mold design methods, the positions of part lines are selected, according to one aspect of the present disclosure, to alleviate molding problems based on the shape of the part being molded. Embodiments described herein can be applied to molds for a wide variety of composite part shapes. As such, the particular composite part shapes discussed below are provided merely by way of example to aid in understanding.

To provide additional context, attention is now directed to FIG. 1, which illustrates one embodiment of an example composite part 100 (e.g., a composite tube). Composite part 100 comprise a tube wall having a rounded upper edge portion 102, a rounded lower edge portion 104 and straight side portions 106 and 108. Upper edge portion 102 transitions to upper straight portions 106 at corners 110 and lower edge portion 104 transitions to lower straight portion 108 at corners 112. Upper straight portions 106 meet lower straight portions 108 at corners 114. While shown as relatively short for the purposes of illustration, composite part 100 may be a long tube.

Figure 2A:
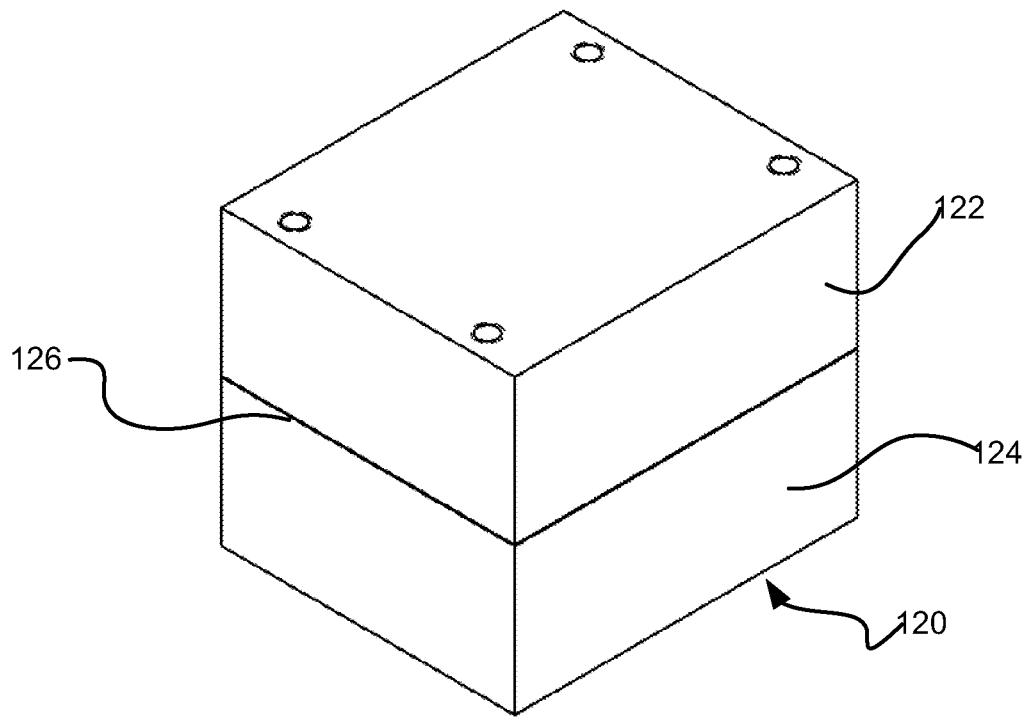
FIG. 2A is a diagrammatic representation illustrating a view of one embodiment of a fully assembled mold.
Figure 2B:
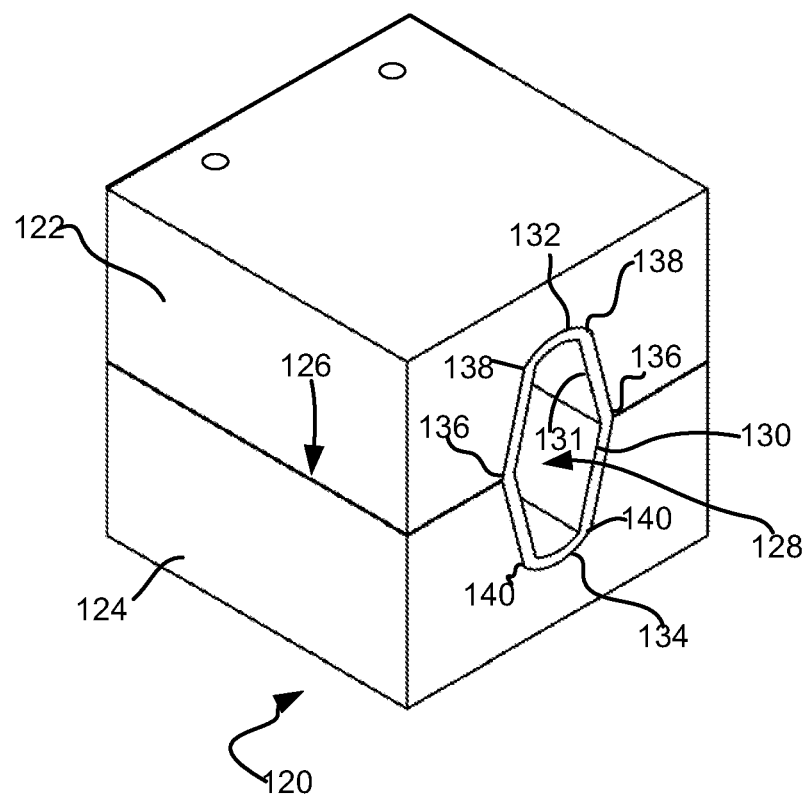
FIG. 2B is a diagrammatic representation illustrating a cutaway view of one embodiment of a mold.
Figure 2C:
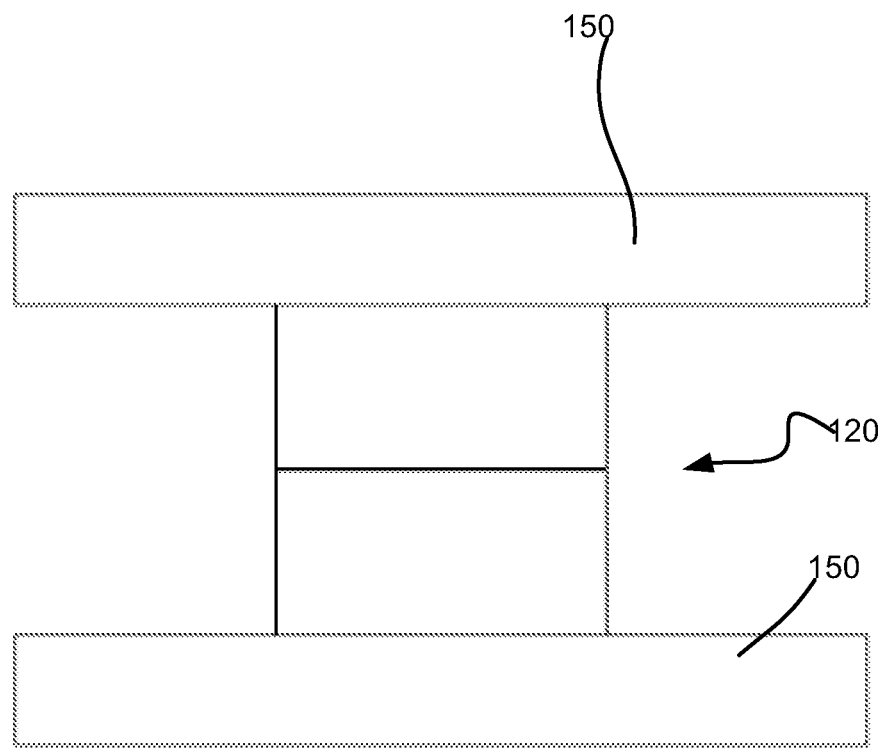
FIG. 2C is a diagrammatic representation illustrating a view one embodiment of a mold in a press.

FIGS. 2A and 2B illustrate an example of a mold 120 that can be used to mold composite part 100 and FIG. 2C illustrates example mold 120 between press plates 150 during a molding operation. Mold 120 includes an upper mold piece 122 and a lower mold piece 124 that meet at part line 126. Mold piece 122 defines an upper portion of a mold cavity 128 and lower mold piece 124 defines a lower portion mold cavity 128. When brought together, upper mold piece 122 and lower mold piece 124 cooperate to form a mold cavity 128 shaped to form the outer surface shape of composite component 100.

In operation, composite material 130 may be layered on the molding surfaces of mold pieces 122, 124 and a shaped bladder 131 placed in mold piece 122. Mold pieces 122, 124 may be bolted or otherwise secured together with the composite material 130 sandwiched between the bladder 131 and the molding surfaces. As illustrated in FIG. 2C, the assembled mold 120 may be pressed between press plates 150. The press plates 150 can apply pressure and, in some cases, heat to mold 120. As the mold heats, bladder 131 will press composite material 130 against the mold surface. Press plates 150 prevent the internal bladder pressure in the mold from pushing the mold pieces 122, 124 apart during heating.

Returning to FIG. 2B, the mold cavity surfaces define an uppermost radius 132, a lowermost radius 134, corners 136, upper corners 138 and lower corners 140. Corners 138 and 140 may be considered sharp corners because they have a small radius. In the embodiment of FIG. 2B, mold cavity 128 includes a number of voiding areas. In particular, air bubble may collect at uppermost radius 132, upper sharp corners 138, lowermost radius 134 and lower sharp corners 140, leading to voiding.

Figure 3A:
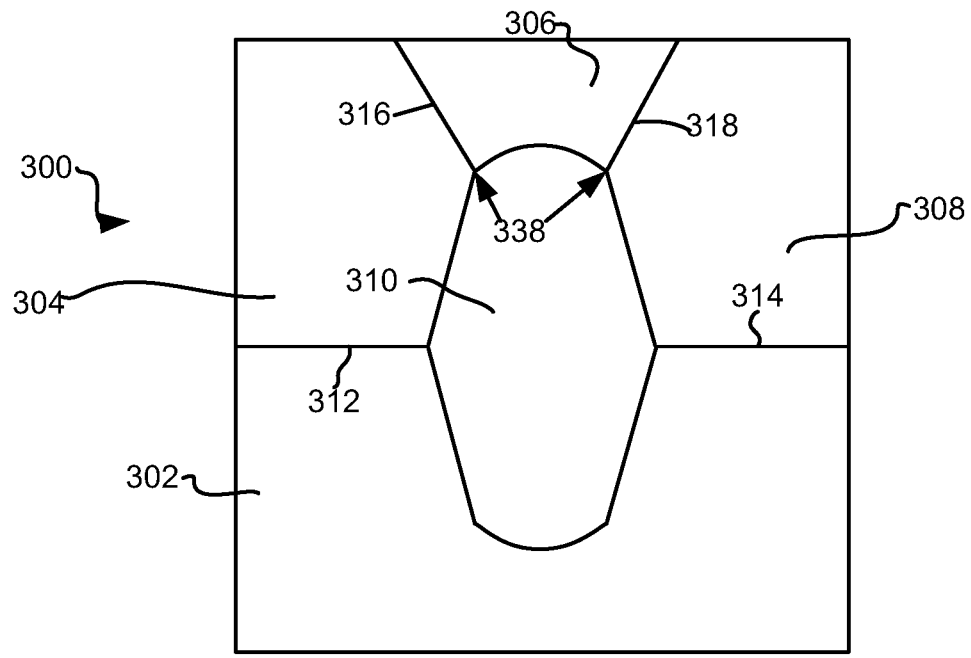
FIG. 3A is a diagrammatic representation illustrating a cross-sectional view of one embodiment of a mold.
Figure 3B:
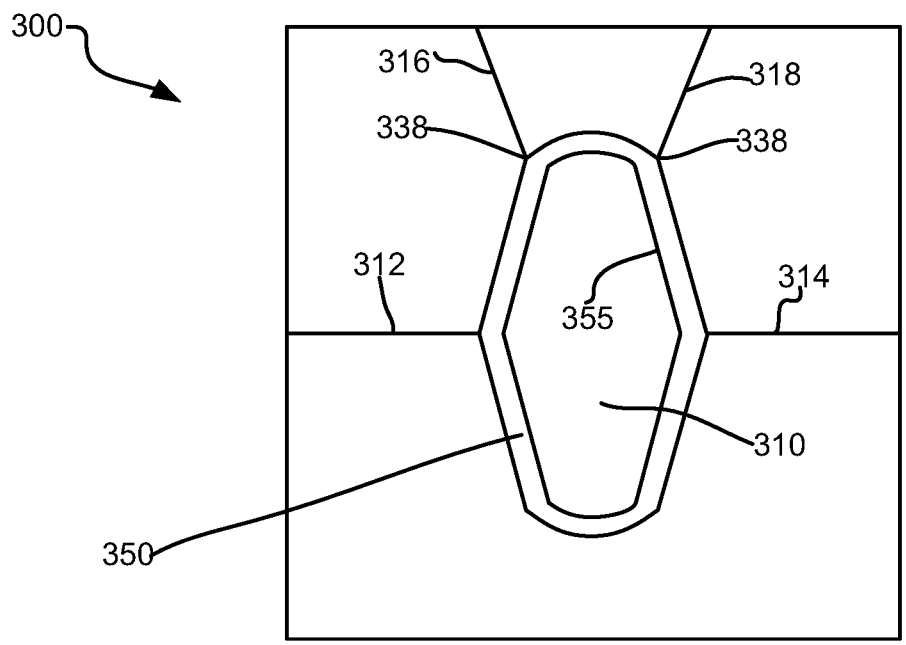
FIG. 3B is a diagrammatic representation illustrating a cross-sectional view of one embodiment of a mold with material disposed therein.
Figure 3C:
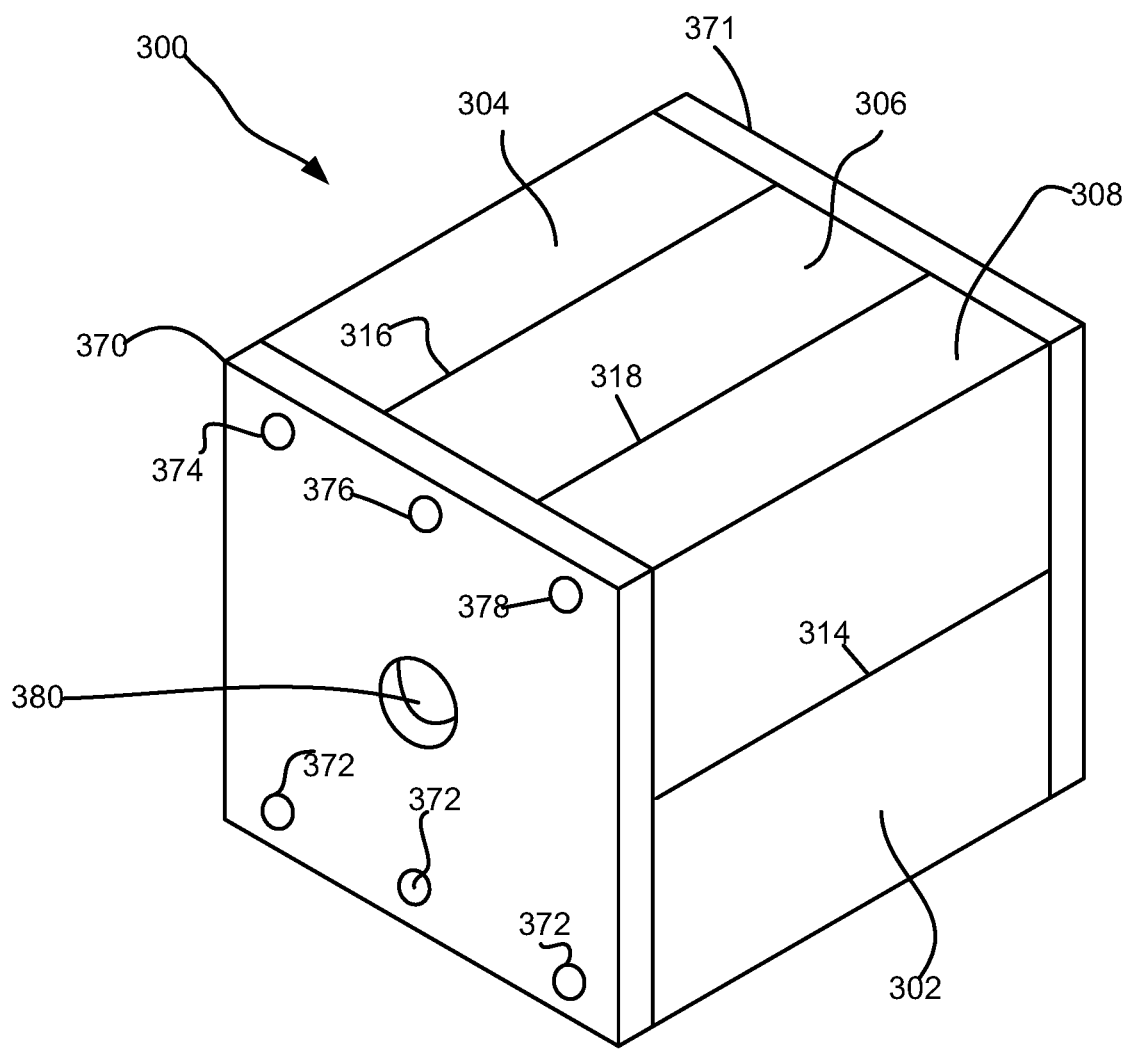
FIG. 3C is a diagrammatic representation illustrating a view of one embodiment of an assembled mold.
Figure 3D:
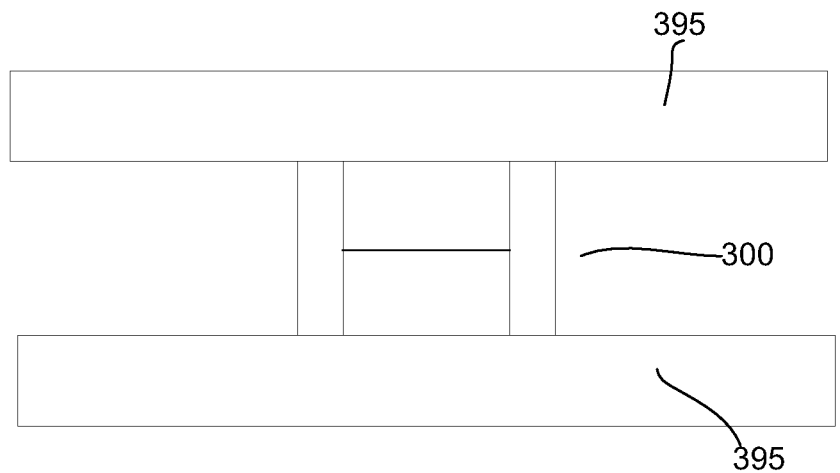
FIG. 3D is a diagrammatic representation illustrating a side view of one embodiment of a mold in a press.
Figure 3E:
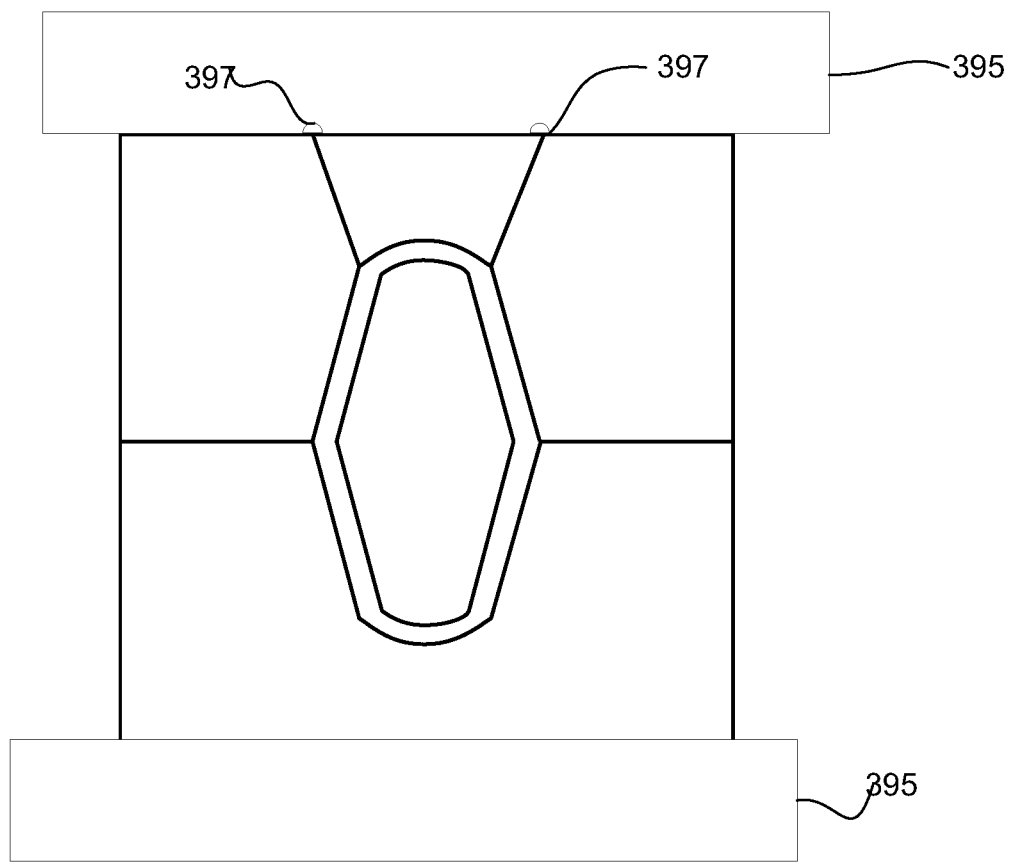
FIG. 3E is a diagrammatic representation illustrating a cross-sectional view of one embodiment of a mold in a press.

Embodiments described herein can include molds that reduce or eliminate voiding. FIG. 3A illustrates one embodiment of a cross-section of an assembled mold 300 that may be used to mold composite part 100 with reduced voiding. In particular, mold 300 has part lines 316 and 318 that act as bleed lines along the upper sharp corners 338 of mold cavity 310. Part lines 316, 318 can allow air to escape at the sharpest radii in the upper portion of the mold cavity 310 to reduce voiding along corners 110 of a part 100 being molded. FIG. 3B illustrates one embodiment of mold 300 with composite material 350 placed in mold 300 between a bladder 355 and the molding surfaces that define mold cavity 310. FIG. 3C illustrates one embodiment of mold 300 assembled using end plates 370, 371. FIG. 3D and FIG. 3E illustrates one embodiment of mold 300 during a molding operation.

With reference to FIGS. 3A-3E, mold 300 includes lower mold piece 302 and upper mold pieces 304, 306, 308, which cooperate to form mold cavity 310 that is shaped to mold composite part 100. Mold pieces 302, 304, 306 and 308 may be coupled together using fasteners (bolts or other fasteners) or by other mechanisms. In the embodiment of FIG. 3C, end plates 370 and 371 are bolted or otherwise fastened to the end faces of mold pieces 302, 304, 306 and 308. For example, end plate 370 may include clearance holes 372, 374, 376, 378 through which bolts, screws or other fasteners can be inserted. The end face of mold piece 302 may include threaded holes that align with clearance holes 372 so that end plate 370 may be fastened to mold piece 302, the end face of mold piece 304 may include a threaded hole that aligns with clearance hole 374 so that end plate 370 may be fastened to mold piece 304, the end face of mold piece 306 may include a threaded hole that aligns with clearance hole 376 so that end plate 370 may be fastened to mold piece 306 and the end face of mold piece 308 may include a threaded hole that aligns with clearance hole 378 so that end plate 370 may be fastened to mold piece 308. End plate 371 may be similarly bolted or otherwise fastened to mold pieces 302, 304, 306, 308. Opening 380 can provide an inlet through which pressure may be applied to pressurize bladder 355.

When assembled, there is a part line 312 between the lower surface of mold piece 304 and the upper surface of mold piece 302, a part line 314 between the lower surface of mold piece 308 and the upper surface of mold piece 302, a part line 316 at the interface between mold piece 304 and mold piece 306 and a part line 318 at the interface between mold piece 308 and mold piece 306. According to one embodiment, mold pieces 302, 304, 306 and 308 are machined or otherwise configured so that they abut along the respective part lines when pressure is not applied to mold cavity 310.

Mold 300 thus includes additional part lines 316 and 318 at the sharp inside corners 338 in the upper portion of the mold cavity 310. Part lines 316 run the length of mold 300 and extend from the inner molding surfaces that define mold cavity 310 to the outer surface of mold 300. In the embodiment illustrated, part lines 316 and 318 are sloped generally up and laterally outward from the respective inside corner 338. According to one embodiment, the part lines 316, 318 extend perpendicular to the tangent of the respective inside corner 338. In another embodiment, part lines 316, 318 may extend straight up or at other angles.

In operation, heat and pressure can be applied to composite material 350 in mold 300. For example, mold 300 may be placed between press plates 395 and heated. Further, pressure may be supplied to the bladder (e.g., via opening 380). As the composite is heated and the pressure in bladder 355 increases, the mold pieces may split apart slightly at the part lines. Air bubbles between the composite material and the molding surface or in the composite material can escape into the gaps formed by the part lines 312, 314, 316, 318 between the faces of the adjacent mold pieces. In particular, voiding can be prevented at the corners 110, 114 of the composite piece 100 being molded. With reference to FIG. 3E, a press plate 395 pressing on an outer surface of mold 300 to which a part lines runs can have offsets 397 (e.g., channels or other offsets) aligned with the part lines. The offsets provide an area into which resin or gas squeezed through the part line can run.

Figure 4A:
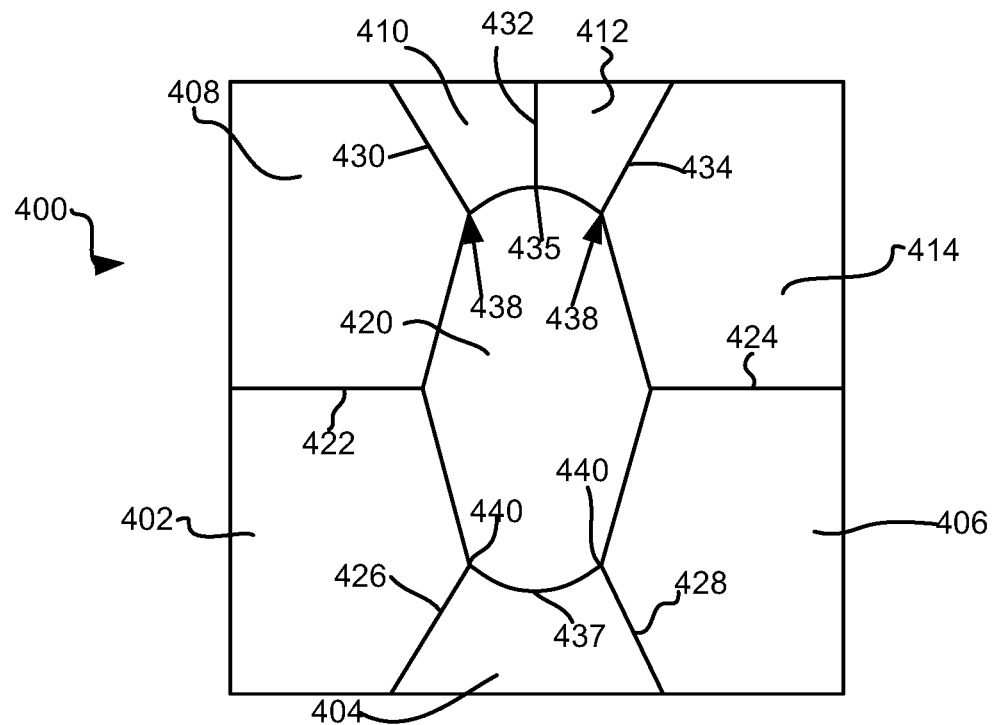
FIG. 4A is a diagrammatic representation illustrating a cross-sectional view of one embodiment of a mold.
Figure 4B:
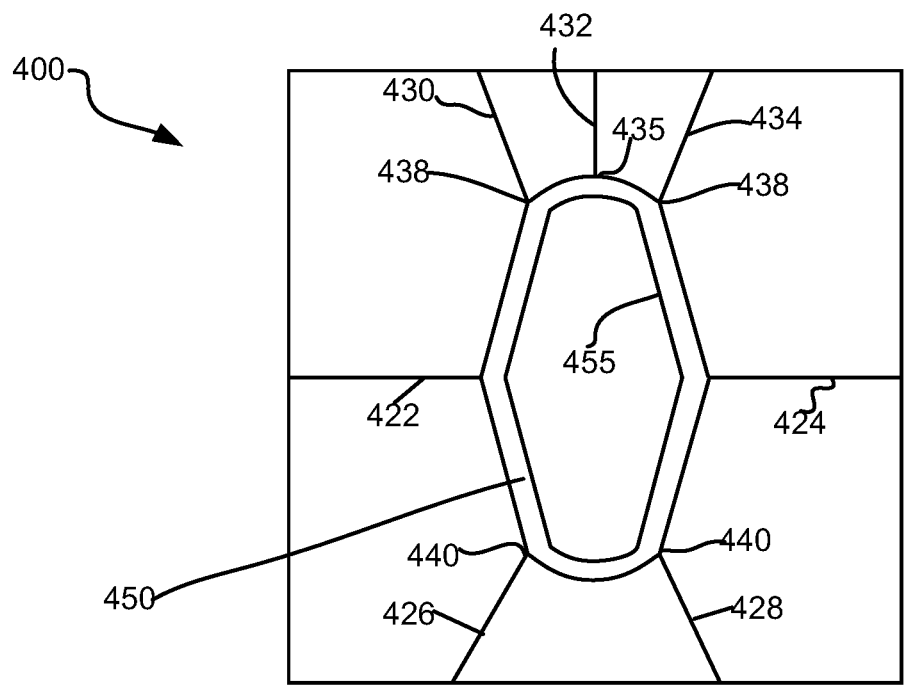
FIG. 4B is a diagrammatic representation illustrating a cross-sectional view of one embodiment of a mold with material disposed therein.
Figure 4C:
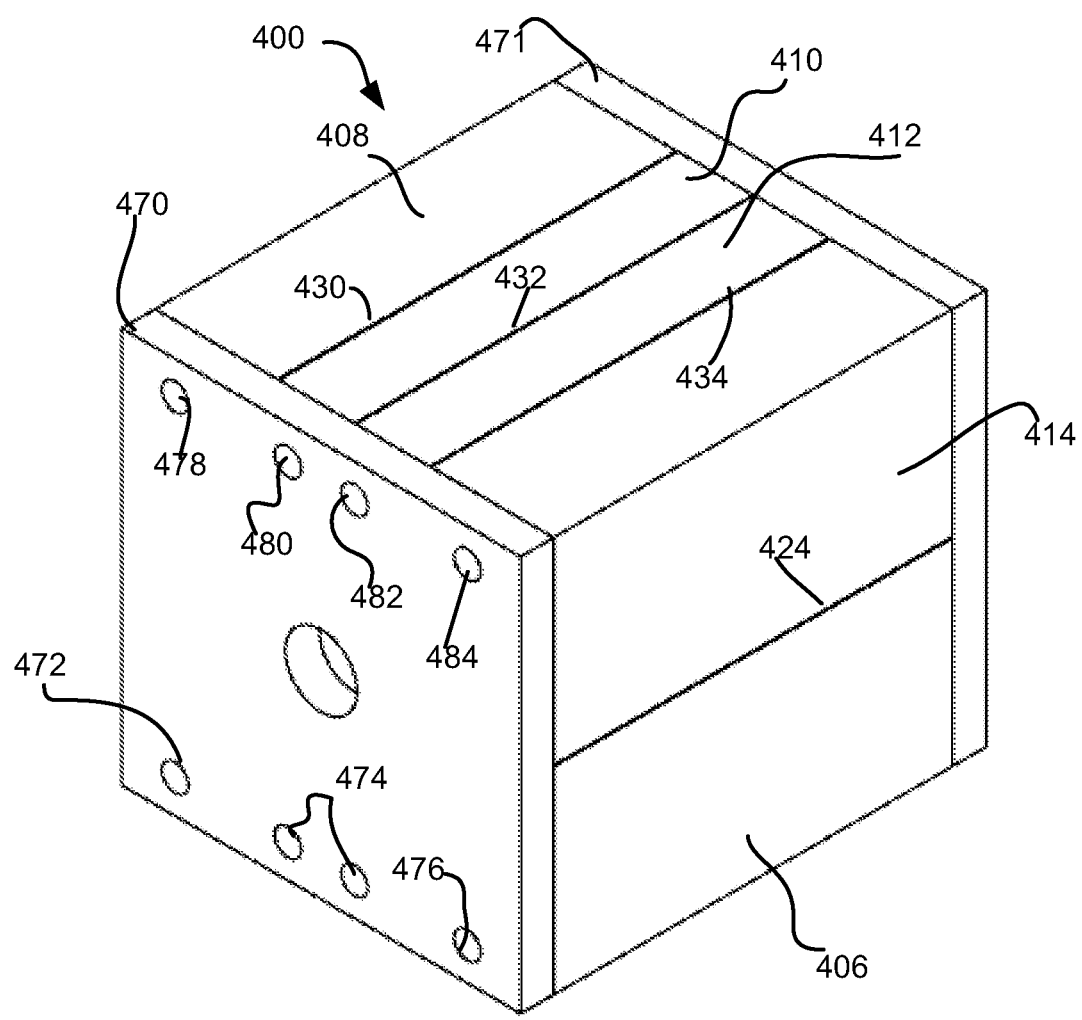
FIG. 4C is a diagrammatic representation illustrating a view of one embodiment of an assembled mold.

FIG. 4A illustrates another embodiment of a mold 400 for molding a composite part 100 with reduced voiding. FIG. 4B illustrates one embodiment of mold 400 with composite material 450 placed in mold 400 between a bladder 455 and the molding surfaces that define mold cavity 420. FIG. 4C illustrates one embodiment of mold 400 assembled with end plates 470, 471.

More particularly, mold 400 includes additional part line 432 at the highest point 435 of the mold cavity 420 to provide a bleed line along the upper surface of the part being molded and allow air that would otherwise collect at the highest point in the mold cavity 420 to escape. In addition, part lines 430, 434 allow air to escape at the sharpest radii in the upper portion of the mold cavity 420. Furthermore, while voiding usually occurs in the upper half of a part, there is still the potential for voiding in the lower part. To this end, mold 400 includes part lines 426 and 428 at the sharp corners 440 in the lower half of the mold cavity 420. Part lines 426 and 428 allow air to escape at the sharpest radii in the lower portion of the mold cavity.

The lower portion of mold 400 comprises mold pieces 402, 404 and 406. The upper portion of mold 400 comprises mold pieces 408, 410, 412, 414, which cooperate to form mold cavity 420 that is shaped to mold composite part 100. Mold pieces 402, 404, 406 and 408 may be coupled together using fasteners (bolts or other fasteners) or by other mechanisms. In the embodiment of FIG. 4C, end plates 470 and 471 are bolted or otherwise fastened to the end faces of mold pieces 402, 404, 406, 408, 410, 412, 414. According to one embodiment, the end faces of mold pieces 402, 404, 406, 408, 410, 412, 414 include threaded openings to receive the bolts or other fasteners. For example, end plate 470 may be bolted or otherwise fastened to mold piece 402 at 472, mold piece 404 at 474, mold piece 406 at 476, mold piece 408 at 478, mold piece 410 at 480, mold piece 412 at 482 and mold piece 414 at 484. End plate 471 may be similarly bolted or otherwise fastened to mold pieces 402, 404, 406, 408, 410, 412, 414. Opening 490 can provide an inlet through which pressure may be applied to pressurize bladder 455.

When assembled, there is a part line 422 between the lower surface of mold piece 408 and the upper surface of mold piece 402, a part line 424 between the lower surface of mold piece 414 and the upper surface of mold piece 406, a part line 426 at the interface between lower mold pieces 402 and 404, a part line 428 at the interface between lower mold pieces 404 and 406, a part line 430 at the interface between upper mold pieces 408 and 410, a part line 436 at the interfaces between upper mold pieces 410 and 412 and a part line 434 at the interface between upper mold pieces 412 and 414. According to one embodiment, mold pieces 402, 404, 406, 408, 410, 412, 414 are machined or otherwise configured so that they abut along the respective part lines when pressure is not applied to mold cavity 420.

Mold 400 thus includes part lines 426 and 428 at the lower sharp inside corners 440, part lines 430 and 434 at the upper sharp inside corners 438 and part line 432 at the highest point 432 of mold cavity 420. According to one embodiment, part lines 426, 428, 430, 432 and 434 run the length of mold 400 and extend from the inner molding surfaces that define mold cavity 420 to the outer surface of mold 400.

In the embodiment illustrated, part lines 430 and 434 are sloped generally up and laterally outward from the respective inside corner 438. According to one embodiment, the part lines 430, 434 extend perpendicular to the tangent of the respective inside corner 438. In another embodiment, part lines 430, 434 may extend straight up or at other angles. Further, part line 432 is illustrated as extending straight up.

In other embodiments, part line 432 may extend at other angles from the highest point in the changer. Further, part lines 426 and 428 are sloped generally down and laterally outward from the respective inside corner 440. In another embodiment, part lines 426, 428 may extend straight down or at other angles relative to the respective inside corner 440. While not illustrated, embodiments may include a mold with a part line at the lowest part 437 of the mold cavity 420 to prevent bubbles from being trapped at lowest radius 437.

In operation, heat and pressure can be applied to composite material 450 in mold 400. For example, mold 400 may be placed between press plates and heated. As the composite is heated and the pressure in bladder 455 increases, the mold pieces may split apart slightly at the part lines. Air bubbles between the composite material and the molding surface or in the composite material can escape into the gaps formed by the part lines 422, 424, 426, 428, 430, 432 and 434 between the faces of the adjacent mold pieces. In particular, voiding can be prevented along the top edge portion 102 and corners 110, 112, 114 of the composite piece 100 being molded.

Figure 5:
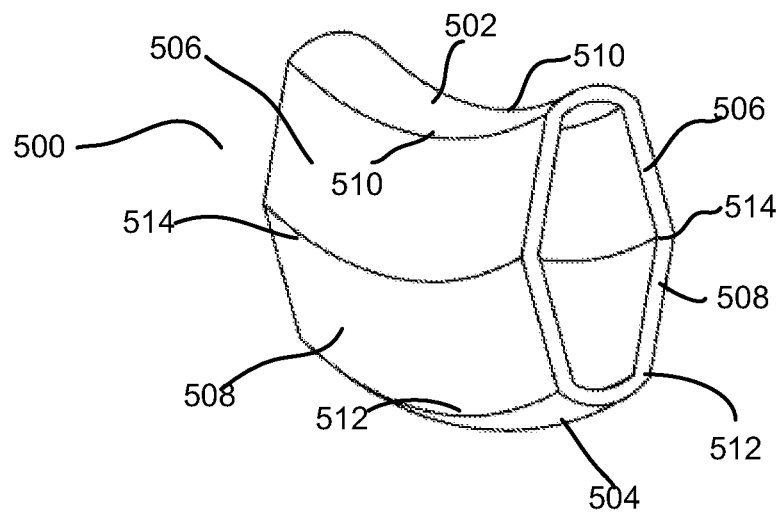
FIG. 5 is a diagrammatic representation of an embodiment of a composite part.

FIG. 5 illustrates another embodiment of a composite part 500. Composite part 500 is similar to composite part 100, but is curved such that the upper, middle and lower corners have a curvature when viewed from the side (e.g., composite part 500 is curved along its long axis). Composite part 500 is defined by a tube wall having an upper rounded portion 502, a lower rounded portion 504 and straight portions 506 and 508. Upper rounded portion 502 transitions to upper straight portions 506 at corners 510 and lower rounded portion 504 transitions to lower straight portion 508 at corners 512. Upper straight portions 506 meet lower straight portions 508 at corners 514. While shown as relatively short for the purposes of illustration, composite part 500 may be a long curved tube or a ring.

Figure 6:
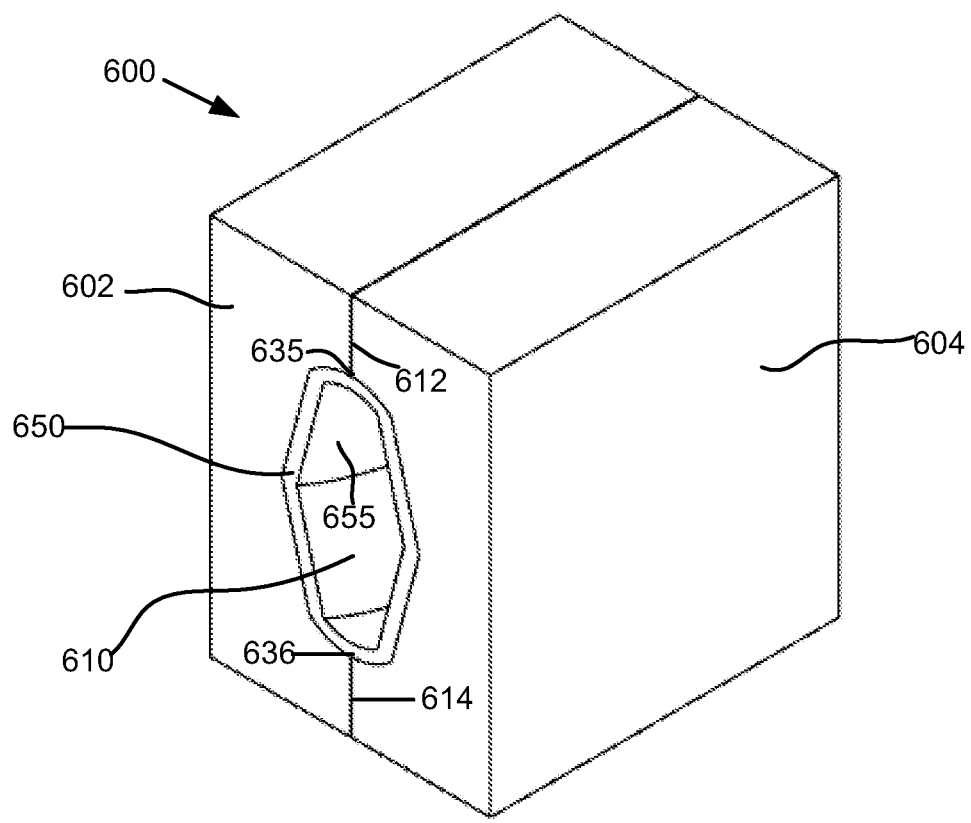
FIG. 6 is a diagrammatic representation of one embodiment of a mold.

FIG. 6 illustrates one embodiment of a mold 600 for molding a curved composite part with reduced voiding. Mold 600 includes mold pieces 602 and 604 which cooperate to form a mold cavity 610 that is shaped to mold composite part 500. For example, mold cavity 610 may be curved from a first end of mold cavity 610 to a second end of mold cavity 610. FIG. 6 further illustrates composite material 650 between bladder 655 and the molding surfaces of the mold cavity 610.

Mold pieces 602 and 604 may be coupled together using fasteners, end plates or other mechanisms. Mold 600 includes part lines 612 and 614 at the interfaces between mold pieces 602, 604. According to one embodiment, mold pieces 602 and 604 are machined or otherwise configured so that they abut along part lines 612, 614 when pressure is not applied to mold cavity 610.

Part line 612 runs from the highest point 635 of mold cavity 610 to the outer surface of mold 600. Part line 614 runs from the lowest point 636 of mold cavity 610 to the outer surface of mold 600. Part lines 612 and 614 provide bleed lines along the upper surface molding surface and lower molding surface of molding cavity 610 to reduce or prevent voiding along the upper surface and lower surface of the part 500 being molded.

In operation, heat and pressure can be applied to composite material 650 in mold 600. For example, mold 600 may be placed between press plates and heated. As the composite is heated and the pressure in bladder 655 increases, the mold pieces may split apart slightly at the part lines. Air bubbles between the composite material and the molding surface or in the composite material can escape into the gaps formed by the part lines 612, 614 between the faces of the adjacent mold pieces. In particular, voiding can be prevented along the top edge 502 and bottom edge 504 of the composite component 500 being molded.

In mold 600, the two mold pieces meet at a flat surface. While the part lines 612, 614 may provide some air bleeding at the highest and lowest points of the cavity, the flat part line reduces molding quality along the curved, sharp radii (e.g., the lower, middle and upper sharp corners).

Figure 7:
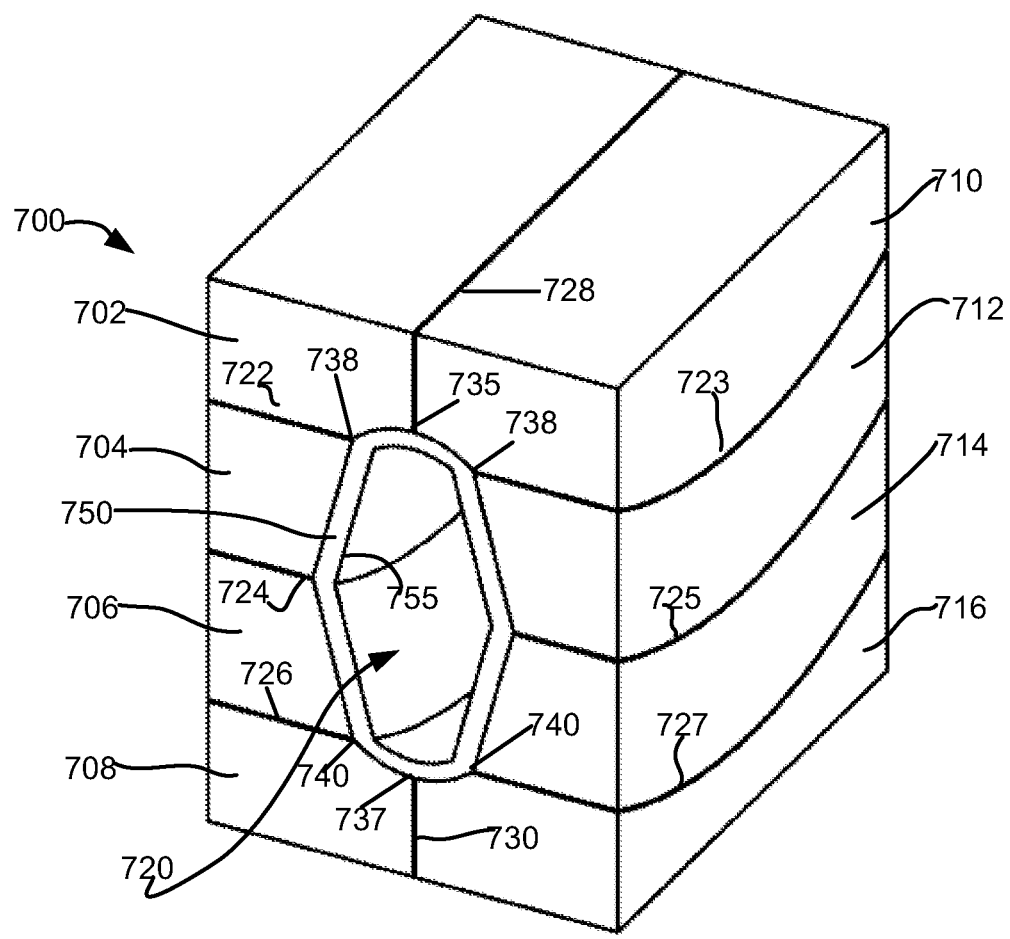
FIG. 7 is a diagrammatic representation of one embodiment of a mold.

FIG. 7 illustrates another embodiment of a mold 700 for molding a curved composite part with reduced voiding. Mold 700 includes mold pieces 702, 704, 706, 708, 710, 712, 714, 716 which cooperate to form a mold cavity 720 that is shaped to mold composite part 500. For example, mold cavity 720 may be curved from a first end of mold cavity 720 to a second end of mold cavity 710. Mold pieces 702, 704, 706, 708, 710, 712, 714, 716 may be coupled together using fasteners, end plates or other mechanisms. FIG. 7 further illustrates composite material 750 between bladder 755 and the molding surfaces of the mold cavity 720.

The lower surfaces of mold pieces 702 and 710 and the upper surfaces of mold pieces 704 and 712 are curved according to the curvature desired along the length of the composite member to form part lines 722, 723 that follow the curvature of the upper sharp inner corners 738 (e.g., the sharpest radii of the upper portion of mold cavity 720) from a first end of mold cavity 720 to a second end of mold cavity 720. The lower surfaces of mold pieces 704 and 712 and the upper surfaces of mold pieces 706 and 714 are similarly curved to create part lines 724, 725 that follow the curvature of the center corners from a first end of mold cavity 720 to a second end of mold cavity 720. The lower surfaces of mold pieces 706 and 714 and the upper surfaces of mold pieces 708 and 716 are curved to form part lines 726 and 727 that follow the curvature of lower sharp corners 740 (the sharpest radii of the lower portion of mold cavity 720) from a first end of mold cavity 720 to a second end of mold cavity 720. Part line 728 is formed at the vertical interface between mold piece 702 and mold piece 710 and part line 730 is formed at the vertical interface between mold piece 708 and mold piece 716. According to one embodiment, mold pieces 702, 704, 706, 708, 710, 712, 714, 716 are machined or otherwise configured to abut along the respective part lines when mold 700 is assembled, but pressure is not applied to mold cavity 720.

Part lines 722, 734 run from upper sharp corners 738 to the outer surface of mold 700 and provide bleed lines along the curvature of upper sharp corners 738. Part lines 724, 725 run from the center corners of mold cavity 720 and provide bleed lines along the curvature of the center corners. Part lines 726, 730 run from the lower sharp corners 740 of the mold cavity 720 to the outer surface of mold 700 to provide bleed lines along the curvature of lower sharp corners 740. Part line 728 runs from the highest portion of mold cavity 720 to the outer surface of mold 700 to provide a bleed line along the curvature of the top surface of mold cavity 720. Part line 730 runs from the lowest portion 737 of mold cavity 720 to the outer surface of mold 700 to provide a bleed line along the curvature of the bottom surface of mold cavity 720.

In operation, heat and pressure can be applied to composite material 750 in mold 700. For example, mold 700 may be placed between press plates and heated. As the composite is heated and the pressure in bladder 755 increases the mold pieces may split apart slightly at the part lines. Air bubbles can escape into the gaps formed by the part lines 722, 723, 724, 725, 726, 727, 728, 730 between the faces of the adjacent mold pieces. In particular, voiding can be prevented along the top edge 502, bottom edge 504, top corners 510, center corners 514 and lower corners 512 of the composite component 500 being molded.

Figure 8:
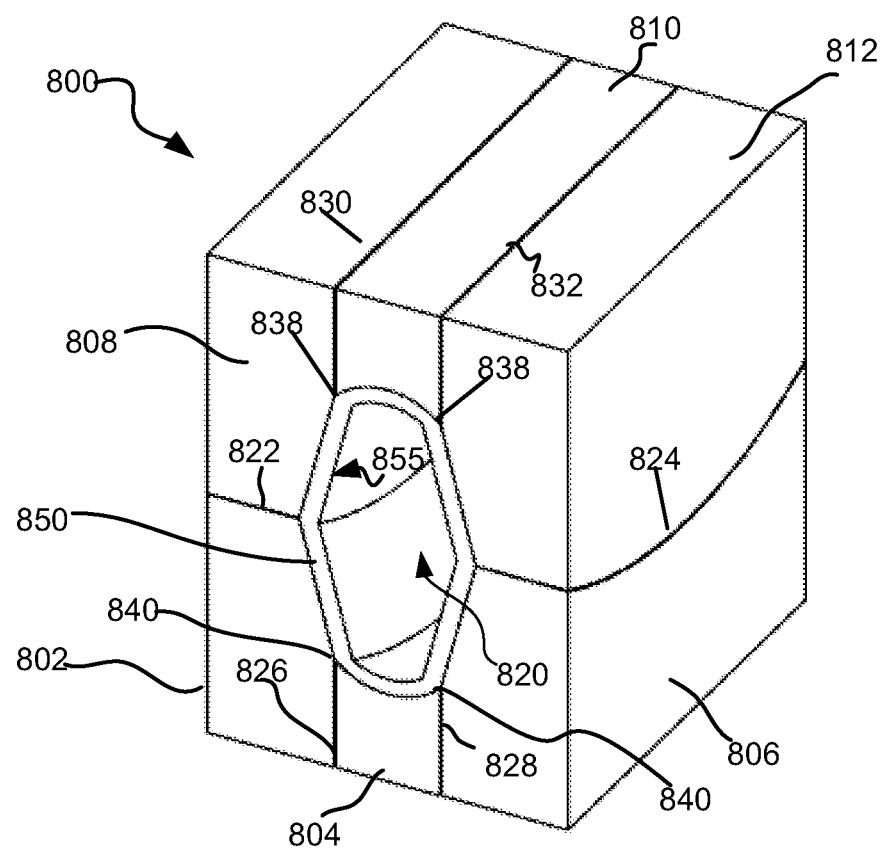
FIG. 8 is a diagrammatic representation of one embodiment of a mold.

FIG. 8 illustrates another embodiment of a mold 800 for molding a curved composite part with reduced voiding. Mold 800 includes mold pieces 802, 804, 806, 808, 810, and 812 which cooperate to form a mold cavity 820 that is shaped to mold composite part 500. For example, mold cavity 820 may be curved from a first end of mold cavity 820 to a second end of mold cavity 820. Mold pieces 802, 804, 806, 808, 810, 812 may be coupled together using fasteners, end plates or other mechanisms. FIG. 8 further illustrates composite material 850 between bladder 855 and the molding surfaces of the mold cavity 820.

The lower surfaces of mold pieces 808 and 812 and the upper surfaces of mold pieces 802 and 806 are curved according to the curvature desired along the length of the composite member to form part lines 822, 824 that follow the curvature of the center inner corners. The lower surfaces of mold piece 810 is adapted to shape the curved upper edge portion 502 of the part 500 being molded and the upper surface of part 804 is adapted to shape for curved lower portion 504 of the composite part 500. Mold 800 further includes a part line 826 at the interface between mold piece 802 and mold piece 804, part line 828 at the interface between mold piece 804 and mold piece 806, part line 830 at the interface between mold piece 808 and mold piece 810 and part line 832 at the interface between mold piece 810 and mold piece.

Part lines 830, 832 run from upper sharp corners 838 to the outer surface of mold 800 and provide bleed lines along the curvature of upper sharp corners 838. Part lines 826 and 828 run from the lower sharp corners 840 of the mold cavity 820 to the outer surface of mold 800 to provide bleed lines along the curvature of lower sharp corners 840. While illustrated as vertical part lines, part lines 826, 828, 830, 832 may be oriented at other angles.

In operation, heat and pressure can be applied to composite material 850 in mold 800. For example, mold 800 may be placed between press plates and heated. As the composite is heated and the pressure in bladder 855 increases the mold pieces may split apart slightly at the part lines. Air bubbles can escape into the gaps formed by the part lines 822, 824, 826, 828, 830, 832 between the faces of the adjacent mold pieces. In particular, voiding can be prevented along top corners 510, center corners 514 and lower corners 512 of the composite component 500 being molded.

In various embodiments described above a bladder (e.g., bladders 355, 455, 655, 755, 855) are used to push the composite material against the moldings surfaces during a molding operation. In other embodiments, a trapped rubber process may be used in which one or more shaped pieces of a rubber (e.g., one or more shaped pieces of silicone) or other material are placed in mold cavity. In such an embodiment, the trapped material is selected to expand as the mold is heated to press the composite materials against the molding surfaces.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the otherwise. Also, as used in the description herein, the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. Moreover, those of skill in the art will appreciate that in some instances some features of embodiments of the invention will be employed without a corresponding use of other features without departing from the scope and spirit of the invention as set forth. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Although specific embodiments have been described, these embodiments are merely illustrative, and not restrictive of the invention. The description herein of illustrated embodiments of the invention is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention. Any dimensions provided are provided by way of example and other embodiments may be sized as needed or desired.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An apparatus for molding a composite material comprising:
    a plurality of mold pieces that cooperate to form a mold having a mold cavity extending from a first end to a second end for molding a composite tube from the first end to the second end of the mold cavity, the mold comprising:
    an outer surface;
    an upper mold portion that defines an upper portion of the mold cavity, the upper mold portion having a lower face, the upper mold portion comprising first, second, and third mold pieces each extending from the first end to the second end of the mold cavity;
    a lower mold portion that defines a lower portion of the mold cavity, the lower mold portion having an upper face adjacent to and that faces the lower face of the upper mold portion; and
    an inner molding surface defining first and second corners at the upper portion of the mold cavity, the plurality of mold pieces split along a plurality of part lines configured to reduce voiding, the plurality of part lines comprising a first part line running between the first corner to the outer surface of the mold between the first and second mold pieces and a second part line running between the second corner to the outer surface of the mold between the second and third mold pieces, the plurality of mold pieces adapted to separate during molding at the plurality of part lines and the plurality of part lines adapted to provide bleed lines for a plurality of voiding areas of the mold cavity.

2. The apparatus of claim 1, wherein the plurality of mold pieces are adapted to separate at the plurality of part lines to form the bleed lines responsive to an application of pressure in the mold cavity.

3. The apparatus of claim 1, wherein the first part line follows a curvature of the first corner from the first end of the mold cavity to the second end of the mold cavity and the second part line follows a curvature of the second corner from the first end of the mold cavity to the second end of the mold cavity.

4. The apparatus of claim 1, wherein the plurality of mold pieces defines a third corner of the mold cavity and a fourth corner the mold cavity and wherein the plurality of part lines comprises:
    a part line running from the third corner to the outer surface of the mold and adapted to provide a bleed line for the third corner;
    a part line running from the fourth corner to the outer surface of the mold and adapted to provide a bleed line for the fourth corner.

5. The apparatus of claim 4, wherein the plurality of mold pieces defines a fifth corner of the mold cavity and a sixth corner the mold cavity and wherein the plurality of part lines comprises:
    a part line running from the fifth corner to the outer surface of the mold and adapted to provide a bleed line for the fifth corner;
    a part line running from the sixth corner to the outer surface of the mold and adapted to provide a bleed line for the sixth corner.

6. The apparatus of claim 4, wherein the plurality of part lines further comprises a part line running from a lowermost portion of the mold cavity to the outer surface of the mold and adapted to provide a bleed line for the lowermost portion.

7. The apparatus of claim 1, wherein the plurality of part lines further comprises a part line running from an uppermost portion of the mold cavity to the outer surface of the mold and adapted to provide a bleed line for the uppermost portion.

8. The apparatus of claim 1, wherein the mold cavity is curved from the first end of the mold cavity to the second end of the mold cavity.

9. The apparatus of claim 1, wherein the plurality of mold pieces comprises at least four mold pieces.

10. The apparatus of claim 1, further comprising a first end plate and a second end plate coupled to the plurality of mold pieces.

11. The apparatus of claim 1, further comprising a shaped bladder inflatable to press composite material against a molding surface of the mold cavity.

12. The apparatus of claim 1, wherein the plurality of part lines comprises a part line running from a smallest radius in an upper portion of the mold cavity to the outer surface.

13. The apparatus of claim 1, wherein the plurality of part lines comprises a straight part line.

14. The apparatus of claim 1, wherein the plurality of part lines comprises a curved part line.

15. The apparatus of claim 1, wherein the plurality of part lines comprises part lines running from every radius in an upper portion of the mold cavity to the outer surface of the mold.

* * * * *